Patented Sept. 29, 1936

2,055,741

UNITED STATES PATENT OFFICE 2,055,741

AZODYESTUFFS

Fritz Ballauf, Cologne-Mulheim, Germany, assignor to General Aniline Works, Inc., New York, N. Y., a corporation of Delaware No Drawing. Application April 24, 1935, Serial No. 18,075. In Germany May 12, 1934

5 Claims. (Cl. 260—44.2)

The present invention relates to new azodyestuffs, more particularly it relates to azodyestuffs which may be represented by the probable general formula:

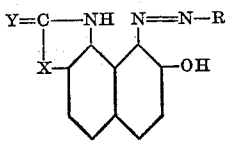

wherein X stands for O or NH, Y stands for O or S, and R stands for the radical of a diazotization component bearing in o-position to the azo group a heavy metal complex forming group, such as the hydroxy group or the carboxylic acid group, and which bears at least one group causing solubility in water, such as the sulfonic acid group.

My new dyestuffs are obtainable by diazotizing a diazotization component suitable for preparing heavy metal complex forming azodyestuffs and bearing at least one group causing solubility in water, and coupling with an 8-hydroxynaphthazole of the general formula:

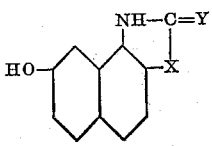

wherein X and Y mean the same as stated above.

My new azodyestuffs are in form of their alkali metal salts generally dark colored powders, soluble in water, dyeing the animal fibre, when after-chromed, generally grey to black shades of excellent fastness properties.

The coupling components used in the manufacture of my new dyestuffs are generally obtainable by acting upon 7-hydroxy-1,2-naphthylenediamine or 1-amino-2,7-dihydroxynaphthalene with phosgene or thiophosgene or functional derivatives of the same, such as chlorocarbonic acid ester or carbon disulfide.

The invention is illustrated by the following examples, without being limited thereto:

*Example 1.*—30 grams of 8-hydroxynaphthoxazolone, prepared by reducing 1-nitroso-2,7-dihydroxynaphthalene (obtainable in accordance with the process described in Berichte der Deutschen Chemischen Gesellschaft, vol. 30, page 1119) in an alkaline medium with hydrosulfite and acting upon the 1-amino-2,7-dihydroxynaphthalene formed with phosgene in an aqueous medium in the presence of sodium acetate, are dissolved in ½ litre of water with the addition of 50 cc. of aqueous caustic soda lye of 30% strength. To the solution obtained is added gradually the diazo solution prepared in the usual manner from 35 grams of 6-nitro-2-amino- phenol-4-sulfonic acid. When the coupling is complete, the dyestuff is precipitated by rendering the solution acid with acetic acid. The reaction mixture is heated to 80° C., the dyestuff is filtered and dried. In the free state it corresponds to the following formula:

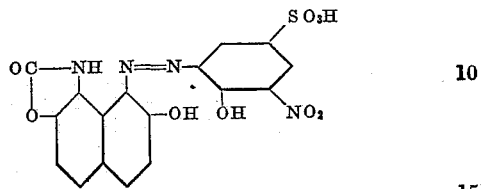

When dyed on wool and after-chromed, the dyestuff yields greenish-black shades of good fastness to light, fulling, potting, boiling in acids, carbonization and hot pressing.

*Example 2.*—30 grams of 8-hydroxynaphthoxazolone are dissolved in ½ litre of water with the addition of 50 cc. of aqueous caustic soda lye. To this solution there is added gradually an aqueous diazo solution prepared from 36 grams of 4-nitro-2-aminophenol-6-sulfonic acid. When the coupling is complete, the whole is worked up as described in Example 1. When dyed on wool and after-chromed in the usual manner, the dyestuff having in the free state the following formula:

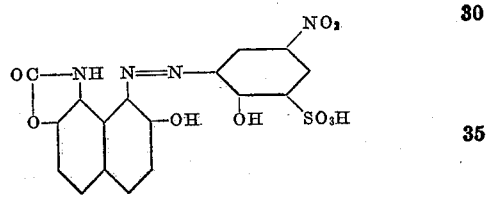

yields black shades of properties similar to those of the dyestuff described in Example 1.

*Example 3.*—30 grams of 8-hydroxynaphthoxazolone are dissolved in ½ litre of water with the addition of 50 cc. of aqueous caustic soda lye of 30% strength. To the solution thus obtained there is added gradually ½ litre of a solution containing the diazo compound from 33 grams of 4-chloro-2-amino-phenol-6-sulfonic acid. The working up is performed as described in Example 1. When dyed on wool and after-chromed in the usual manner, the dyestuff having in the free state the following formula:

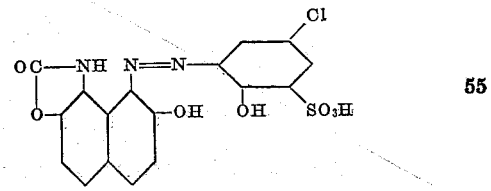

yields blackish-blue shades.

*Example 4.*—30 grams of the urea from 2-hydroxy-7,8-naphthylenediamine, prepared by treating 7,8-diamino-2-naphthol (obtainable in accordance with the process described in Berichte der Deutschen Chemischen Gesellschaft, vol. 30, page 1124) with phosgene in aqueous solution in the presence of sodium acetate, are dissolved in ½ litre of water with the addition of 50 cc. of aqueous caustic soda lye of 30% strength. To the solution thus obtained there is added gradually ½ litre of a solution containing the diazo compound from 35 grams of 6-nitro-2-aminophenol-4-sulfonic acid. The working up is performed as described in Example 4. When dyed on wool and after-chromed, the dyestuff having in the free state the following formula:

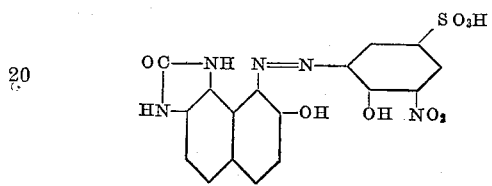

yields a black of good fastness properties.

If instead of 6-nitro-2-aminophenol-4-sulfonic acid there is used the isomeric 4-nitro-2-aminophenol-6-sulfonic acid, there is obtained a dyestuff possessing similar properties.

*Example 5.*—30 grams of the urea from 2-hydroxy-7,8-naphthylenediamine are dissolved in ½ litre of water with the addition of 50 cc. of aqueous caustic soda lye of 30% strength. To the solution thus obtained there is added gradually ½ litre of a solution containing the diazo compound from 33 grams of 4-chloro-2-aminophenol-6-sulfonic acid. The working up is performed as described in Example 1. When dyed on wool and after-chromed, the dyestuff having in the free state the following formula:

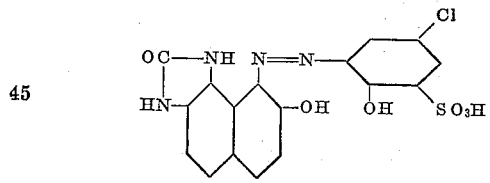

yields bluish-black shades.

*Example 6.*—30 grams of the thiourea from 2-hydroxy-7,8-naphthylenediamine are dissolved in ½ litre of water with the addition of 50 cc. of aqueous caustic soda lye of 30% strength. To the solution thus obtained there is added gradually ½ litre of the diazo solution prepared in the usual manner of 35 grams of 6-nitro-2-aminophenol-4-sulfonic acid. The dyestuff is precipitated by the addition of acetic acid, filtered while hot and dried. When dyed on wool and after-chromed in the usual manner, the dyestuff having in the free state the following formula:

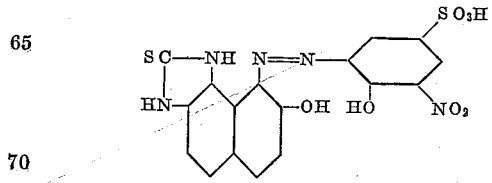

yields a black of good fastness properties.

I claim:

1. Azodyestuffs of the general formula:

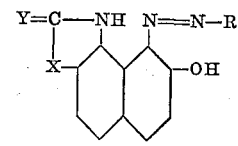

wherein X stands for a member of the group consisting of O and NH, Y stands for a member of the group consisting of O and S, and R stands for the radical of an aromatic diazotization component bearing in o-position to the azo group a heavy metal complex forming group and which bears at least one group causing solubility in water, being in form of their alkali metal salts generally dark colored powders, soluble in water and dyeing the animal fibre, when after-chromed, generally grey to black shades of excellent fastness properties.

2. Azodyestuffs of the general formula:

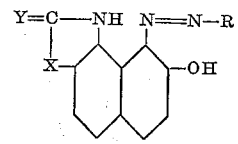

wherein X stands for a member of the group consisting of O and NH, Y stands for a member of the group consisting of O and S, and R stands for a benzene sulfonic acid radical bearing in o-position to the azo group a hydroxy group, being in form of their alkali metal salts generally dark colored powders, soluble in water and dyeing the animal fibre, when after-chromed, generally grey to black shades of excellent fastness properties.

3. The azodyestuff having in the free state the following formula:

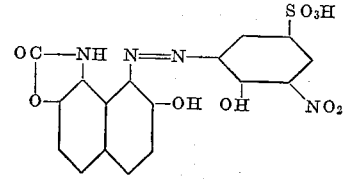

yielding, when dyed on wool and after-chromed, greenish-black shades of good fastness to light, fulling, potting, boiling in acids, carbonization and hot pressing.

4. The dyestuff of the following formula:

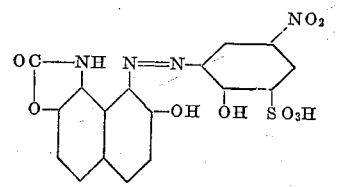

dyeing the animal fibre, when after-chromed, black shades of excellent fastness properties.

5. The dyestuff of the following formula:

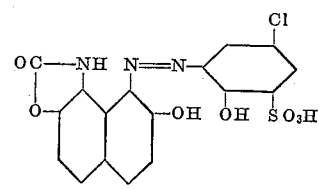

dyeing the animal fibre, when after-chromed, blackish-blue shades of excellent fastness properties.

FRITZ BALLAUF.